US012609888B2

(12) United States Patent
Wong

(10) Patent No.: US 12,609,888 B2
(45) Date of Patent: Apr. 21, 2026

(54) NON-MINIMAL ROUTING ON MESH NETWORK

(71) Applicant: David I-Keong Wong, Fremont, CA (US)

(72) Inventor: David I-Keong Wong, Fremont, CA (US)

(73) Assignee: David I-Keong Wong, Fremont, CA (US)

( * ) Notice: Subject to any disclaimer, the term of this patent is extended or adjusted under 35 U.S.C. 154(b) by 309 days.

(21) Appl. No.: 18/488,638

(22) Filed: Oct. 17, 2023

(65) Prior Publication Data

US 2025/0126052 A1 Apr. 17, 2025

(51) Int. Cl.
*H04L 45/24* (2022.01)
*H04L 45/02* (2022.01)

(52) U.S. Cl.
CPC .............. *H04L 45/24* (2013.01); *H04L 45/04* (2013.01)

(58) Field of Classification Search
None
See application file for complete search history.

(56) References Cited

U.S. PATENT DOCUMENTS 10,892,982 B2 * 1/2021 Gao ........................ H04L 45/03
12,218,831 B2 * 2/2025 Nallamothu ........ H04L 12/4625

2010/0157794 A1 * 6/2010 Nakash ................... H04L 45/22
 370/228
2012/0170582 A1 * 7/2012 Abts ....................... H04L 45/06
 370/392
2017/0346718 A1 * 11/2017 Psenak .................... H04L 45/12
2021/0127269 A1 * 4/2021 Gupta ................... H04L 63/061
2025/0119378 A1 * 4/2025 Sherlock .............. H04L 47/122

OTHER PUBLICATIONS

U.S. Appl. No. 63/589,116 Provisional Application—Invention Disclosure IDF-171951 (Hewlett Packard Enterprise): "Advanced Congestion Avoidance Mode in the CXL-3.1 example 4-node Mesh Topology" (Jun. 22, 2023) by Derek Sherlock, whole document (Oct. 9, 2023) (Year: 2023).*

* cited by examiner

*Primary Examiner* — Xavier S Wong

(57) ABSTRACT

A non-minimal routing method of the n-node mesh network is disclosed. An n-node mesh network is logically segmented into n layers of virtual n-node mesh networks. In each node, there are one primary route table and n–1 transition route tables, each from a different virtual network. In each virtual network Access Control List (ACL) prefix filtering is configured to prohibit routes of minimal distance. A loopback address of a node is redistributed to each of the n–1 transition route tables in the node, setting up routes and pointers, pointing to the primary route table for processing, The address is advertised to the other n–1 nodes in a virtual network through the Border Gateway Protocol (BGP) process and route selection rules. The routes of the primary route table are built up by receiving multi-path prefix advertisements from the same network; the transition route tables are built up by receiving prefix advertisements from the same virtual network.

3 Claims, 12 Drawing Sheets

NON-MINIMAL ROUTING ON MESH NETWORK

FIELD OF INVENTION

The present invention relates to a multipath non-minimal routing on structured IP networks. In particular, the present invention relates to a multipath 2-hop dynamic routing on a mesh network.

BACKGROUND

The continuing expansion of the Cloud and the AI computing push the change of the datacenter networks around the world, as it requires a set of features more than the Clos in Table 3—"Comparisons of Infiniband and Ethernet Technologies".

Note where the adaptive routing is an intelligent routing technology used in large-scale networks. It has several components including dynamic path selection, load balancing and congestion avoidance, and can be implemented on Infiniband or Ethernet. Unlike static routing, where paths are predetermined, adaptive routing dynamically selects the best paths based on real-time network conditions, such as link utilization, congestion, and available bandwidth. Adaptive Routing optimizes data flows, load balances traffic, and avoids congestion, leading to improved network performance and fault tolerance.

TABLE 1

| | Comparisons of Infiniband and Ethernet Technologies | |
|---|---|---|
| | Infiniband | Ethernet |
| Physical Layer | FEC, Data Rate different | CRC |
| Link Layer | Flow Control | MAC |
| Network Layer | RD - connectionless | IP |
| | RC - connection-oriented | |
| Transport Layer | DMA, RDMA | TCP, UDP, RDMA |
| Network Topologies | Hypercube, Torus and Mesh, Dragonfly, PolarFly, Dual-Rail, HPC-Specifics (Butterfly, D-Cell), Spine-and-Leaf, Clos Fabric | Three-Tier, Partial Mesh and Hybrid, Overlay Networks, Spine-and-Leaf, Clos Fabric |
| DPU Smart Card for Server CPU-offload | Out-of-Order Packets Handling | Out-of-Order Packets Handling |
| Load Balance | Load Awareness in Adaptive Routing, Randomized, Round Robin, Queue Length-Based, Equal-Cost Multipath (ECMP) | Port-Based, Hash-Based, Application-Aware, Dynamic Load Balancing with SDN, Packet Spraying, ECMP |
| Routing Technology | Port-Based Routing, Dimensional Routing, Source Routing, Viral Routing, Adaptive Routing | BGP SPF Routing, MPLS Label Switch/Routing, SR Routing, Adaptive Routing |
| Adaptive/Routing Algorithms | Infiniband: Up/Down algorithm, TREE(Fat-Tree), DFP(Dragonfly+), Min Hop On paper: DOR, MAR, GAR, LAR, Valiant | Dijkstra's algorithm, Bellman-Ford's algorithm |
| Network Virtualization Technologies | None | VPN, VxLAN, VRF-lite, EVPN | topology alone can provide, notably the requirements of low congestion, low latency, high throughput, good scalability and network resiliency. In the past decades, Clos topology has been deployed worldwide to carry out cloud traffic. The operators have indicated that their networks suffer from flow collisions causing congestion and long tail delay. And then in the era of AI computing, network congestion control is added on top of the Clos topology to "eliminate" the network congestion, long tail delay and to improve the overall network latency. However, the congestion control works by reducing source traffic below BDP (Bandwidth-Delay Product) line, and will further reduce the source traffic on a path until severe congestion disappears. When the traffic pattern changes it can incur network congestion even to a previously tuned network. When this happens, the network throughput drops to an undesirably low level under the congestion control.

It can be beneficial to review the current state-of-the-art networking technologies for the Cloud, and AI Computing InfiniBand and Ethernet are drastically two different technologies, and do not interoperable with each other. InfiniBand itself is a low-level interconnect technology designed for high-performance computing (HPC) and data center environments. Infiniband is commonly used in Clos network with adaptive routing for AI computing. Examples of this are Nvidia DGX A100 Server, DGX POD, DGX SuperPOD, and Nvidia Selene (Supercomputer based on DGX Super-POD). Lack of the Ethernet-like evolution and industry accumulation Infiniband does not natively support VPN, VxLAN, VRF-lite, EVPN technologies, making Infiniband hard to interoperable to the existing cloud technology. Supporting business model such as multi-tenancy is also hard for Infiniband.

Ethernet technology plays a vital role in data centers as it provides the primary connectivity and networking infrastructure for modern data center environments. The industry has invested heavily and built upon for decades on existing Ethernet/IP-based networking technologies such as BGP, VRF-lite, VxLAN, SR, EVPN, etc., and has the widest range of interoperable devices from computing, storage and networking industries. Ethernet provides the foundation for network virtualization technologies in data centers. Technologies like Virtual Extensible LAN (VXLAN) and Network Virtualization using Generic Routing Encapsulation (NVGRE) allow for the creation of virtual networks overlaying the physical infrastructure, enabling more efficient use of resources and better network segmentation, which are the underlaying technologies for the Cloud. Overall, Ethernet technology's scalability, high performance, and much wider interoperable to many networking devices and industry support making it the backbone of modern data center networks, providing the connectivity required to support the ever-increasing demands of cloud computing, big data, artificial intelligence, and other data-intensive workloads. Ethernet is commonly used in Clos network with BGP routing for the Cloud, and AI/HPC computing.

Infiniband has detailed flow control, congestion control as well as various routing mechanisms supporting topologies to match up with the specific workloads-good for the AI/HPC computing. But these flexibilities can become complex tasks for network operation & administration. Both Infiniband and Ethernet are capitalizing on Clos network topology. Clos topology was emerged in the time when network virtualization and Cloud got started where high bandwidth and supports of the east and west traffic were the primary focus. But Clos doesn't have sufficient path diversity, when compared to the Mesh, as is needed in low congestion networks. And low congestion network is crucial for the continuing growth of the AI computing, and Cloud computing.

However, expanding the BGP capability to do multipath dynamic routing to exploit the 2-hop path diversity in Mesh network isn't trivial. This is because dynamic routing protocol such as BGP finds the shortest path to each of its neighbors due to the Dijkstra's algorithm. Furthermore, the routing is based on destination prefix. Meaning the prefix of the destination alone is used to determine the route path.

SUMMARY

The present disclosure provides an n-node mesh network structure and a routing method to operate the n-node mesh network. Each node in the network contains m (m is an integer, $m \geq 1$) external network interfaces, one to k loopback interfaces (k is an integer, $k \geq 1$), and (n−1) internal network interfaces (n is an integer, $n \geq 3$). Each node is interconnected to one of the other nodes through an internal network interface to form the n-node mesh network. An n-node mesh network is logically segmented into n layers of virtual networks, where each of the virtual network is a logical n-node mesh network. The logical node is also called segmented node, and the logical interfaces is also called sub-interface. Each segmented node contains a route table; and the route table is called a primary route table if the segmented node is configured to include the external network interfaces and the loopback interfaces in the same virtual network; otherwise, the route table is called a transition route table. In each virtual network, the sub-interface connecting the segmented node containing the primary route table, and the segmented node containing the transition route table, ACL prefix filtering to block prefix advertisement is configured at the outgoing direction of the sub-interface of the segmented node containing the transition route table. This ensures that prefix is advertised through the other sub-interfaces of the segmented node containing the transition route table to create routes of non-minimal distance but equal-cost paths. Typically, a loopback address representing the endpoint of a node is advertised in its segmented node. The advertised prefix is redistributed, through export/import mechanism, to each of the (n−1) segmented nodes each containing a transition route table in the node, setting up a route entry and a pointer, pointing back to the primary route table for additional table lookup, in each of the transition route tables in the node. The prefix in a segmented node is further advertised to the other (n−1) segmented nodes in a virtual network through the BGP process and route selection rules. The route entries of the primary route table are built up by receiving multi-path prefix advertisements from the other segmented nodes in the same virtual network; the transition route tables are built up by receiving prefix advertisement from the other segmented nodes in the same virtual network.

DETAILED DESCRIPTION

The implementation mode of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complicated. To make the illustrations as concise as possible, not all structures are shown in the attached drawings.

In the following discussions networking devices capable of performing network switching and routing functions such as switch, router, etc. are collectively called the node.

To improve the above problems a general approach can be taken. Under the general approach, research direction is taken to look at the path diversity of network topology, topological and architectural improvements to the datacenter networks, however the negative impacts to the existing routing (BGP protocol in particular) protocol should be kept minimal to preserve previous cloud investments resulting in more effective network supporting various business goals.

In Mesh and Clos topologies, particularly in the area of path diversity as related to network congestion, path "Diversity Ratio" is defined, and is used to compare Clos and Mesh topologies under various configurations. Result shows that the Mesh topology has many folds of paths than the Clos topology across a wide range of practical configurations. From above the Mesh topology exhibits much lower network congestion than its counterpart (the Clos). The Mesh+ Mesh and Clos+Mesh architectures for cloud and AI datacenters were claimed. In this patent application, a multipath 2-hop dynamic routing for Mesh topology is described. Before detailed description is given a theoretical oriented background is given.

Figure 1:
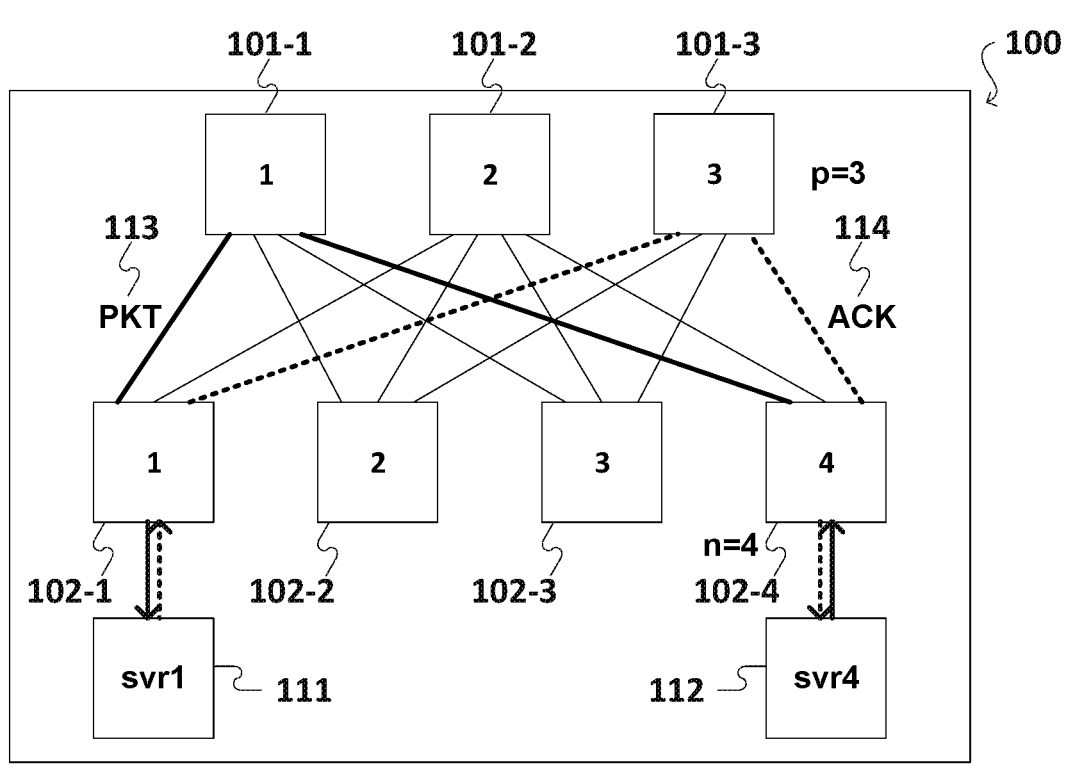
FIG. 1 illustrates a schematic block diagram of round-trip paths of data and ACK packets in (p, n)-node Clos (p=3, n=4).
Figure 2:
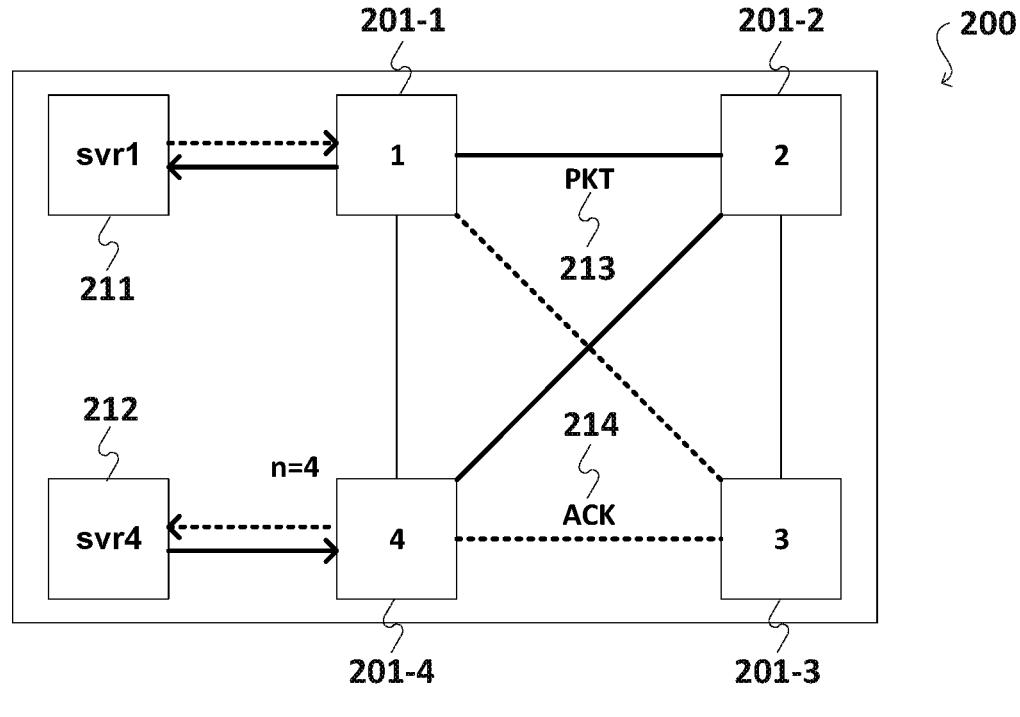
FIG. 2 illustrates a schematic block diagram of round-trip paths of data and ACK packets in n-node Mesh (n=4).

For those who understands TCP transport protocol knows that a data packet must have a returning ACK packet as shown in FIG. 1—"Round-Trip Paths of Data and ACK Packets in (p, n)-node Clos (p=3, n=4)". Initially svr4 112 sends a data packet going through leaf switch 102-4, fabric switch 101-1, leaf switch 102-1 and arriving svr1 111. Subsequently svr1 111 sends an ACK packet going through leaf switch 102-1, fabric switch 101-3, leaf switch 102-4 and arriving svr4 112. Another example is shown in FIG. 2—"Round-Trip Paths of Data and ACK Packets in n-node Mesh (n=4)". Initially svr4 212 sends a data packet going through switch 201-4, switch 201-2, switch 201-1 and arriving svr1 211. Subsequently svr1 211 sends an ACK packet going through switch 201-1, switch 201-3, switch 201-4 and arriving svr4 212.

If network congestion happened to either of the path where data packet is on or the path where the ACK packet is on, longer RTT (Round-Trip Time) will be measured and the congestion control will slow down the sending rate of the data packets. In the rare case where the network congestion became so severe resulting either data packet or ACK packet drop, few RTT later, packet will be resent resulting long tail delay. In AI computing the long tail delay does cause a lot of computation deficiency.

When a TCP transport layer is communicating with another TCP transport layer over a network, the data packet is traversing a path of two interconnect segments (2-hop), the same is true for the returning ACK-packet. A round trip path consists of the above data path and the ACK path. A round-trip path is called non-overlapping when it doesn't overlap with the other round-trip path. Obviously packets on a non-overlapping path do not incur network congestion, good throughput and shortest round-trip time are both achieved.

The question that we want to ask is: How many non-overlapping paths are there in a (p, n)-node Clos network and in an n-node Mesh network, where p is the number of fabric switches, and n is the number of leaf switches. We get the formulas in Table 1—"Maximum number of non-overlapping paths and diversity ratios of Clos and Mesh topologies".

TABLE 1

Maximum number of non-overlapping paths and diversity ratios of Clos and Mesh topologies

| Topology | Max number of non-overlap paths (2-hop) | Diversity Ratio |
|---|---|---|
| (p, n)-node Clos | pn/2 | 1 |
| n-node Mesh | (n − 1)n/4 | (n − 1)/2p |

To estimate the maximum number of non-overlapping paths which the Clos and Mesh topologies have, an abstract approach is taken by counting the number of interconnects the topology has and divide it by 2. The reason is that two interconnects form a path (we are doing 2-hop routing for both Clos and Mesh networks). Since each interconnect is duplex making the previous statement valid for both the data path and the ACK path. We then compare the number of non-overlapping paths between a Mesh and Clos topology by dividing the Mesh from the Clos to create a metric called diversity ratio. A topology having its diversity ratio larger than 1 means that it has more non-overlapping paths than the Clos counterpart. Within a large practical range of configurations from Clos network deployed worldwide, Mesh network has more non-overlapping paths than the Clos counterpart.

For those who are experienced with the ECMP multipathing, knows that a random number generator is working behind the scene to distribute the large number of TCP connections to the finite number of the multipaths. With a small set of the non-overlapping paths (with small diversity ratio), more TCP connections will get wrapped into the same path creating overlapped path and inducing network congestion to occur.

A diversity matrix is show in Table 2—"Diversity Matrix where Diversity Ratio=(n−1)/2p" where a large range (numbers with diversity ratio>1 and shown in bold) of datacenter Clos networks can be replaced by its Mesh counterparts to benefit from improved congestion characteristic.

TABLE 2

Diversity Matrix where Diversity Ratio = (n − 1)/2p

| | | p | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| n | 4 | 1.5 | 0.8 | 0.5 | 0.4 | 0.3 | 0.3 | 0.2 | 0.2 | 0.2 | 0.2 | 0.1 | 0.1 |
| | 8 | 3.5 | 1.8 | 1.2 | 0.9 | 0.7 | 0.6 | 0.5 | 0.4 | 0.4 | 0.4 | 0.3 | 0.3 |
| | 12 | 5.5 | 2.8 | 1.8 | 1.4 | 1.1 | 0.9 | 0.8 | 0.7 | 0.6 | 0.6 | 0.5 | 0.5 |
| | 16 | 7.5 | 3.8 | 2.5 | 1.9 | 1.5 | 1.3 | 1.1 | 0.9 | 0.8 | 0.8 | 0.7 | 0.6 |
| | 24 | 11.5 | 5.8 | 3.8 | 2.9 | 2.3 | 1.9 | 1.6 | 1.4 | 1.3 | 1.2 | 1.0 | 1.0 |
| | 32 | 15.5 | 7.8 | 5.2 | 3.9 | 3.1 | 2.6 | 2.2 | 1.9 | 1.7 | 1.6 | 1.4 | 1.3 |
| | 48 | 23.5 | 11.8 | 7.8 | 5.9 | 4.7 | 3.9 | 3.4 | 2.9 | 2.6 | 2.4 | 2.1 | 2.0 |
| | 64 | 31.5 | 15.8 | 10.5 | 7.9 | 6.3 | 5.3 | 4.5 | 3.9 | 3.5 | 3.2 | 2.9 | 2.6 |
| | 96 | 47.5 | 23.8 | 15.8 | 11.9 | 9.5 | 7.9 | 6.8 | 5.9 | 5.3 | 4.8 | 4.3 | 4.0 |
| | 128 | 63.5 | 31.8 | 21.2 | 15.9 | 12.7 | 10.6 | 9.1 | 7.9 | 7.1 | 6.4 | 5.8 | 5.3 |
| | 144 | 71.5 | 35.8 | 23.8 | 17.9 | 14.3 | 11.9 | 10.2 | 8.9 | 7.9 | 7.2 | 6.5 | 6.0 |

In a useful and large range of datacenter configurations the Mesh topology has many folds of non-overlapping paths than its Clos counterpart. And this implies that the Mesh network shall incur much less congestion for Cloud and AI computing.

Figure 3A:
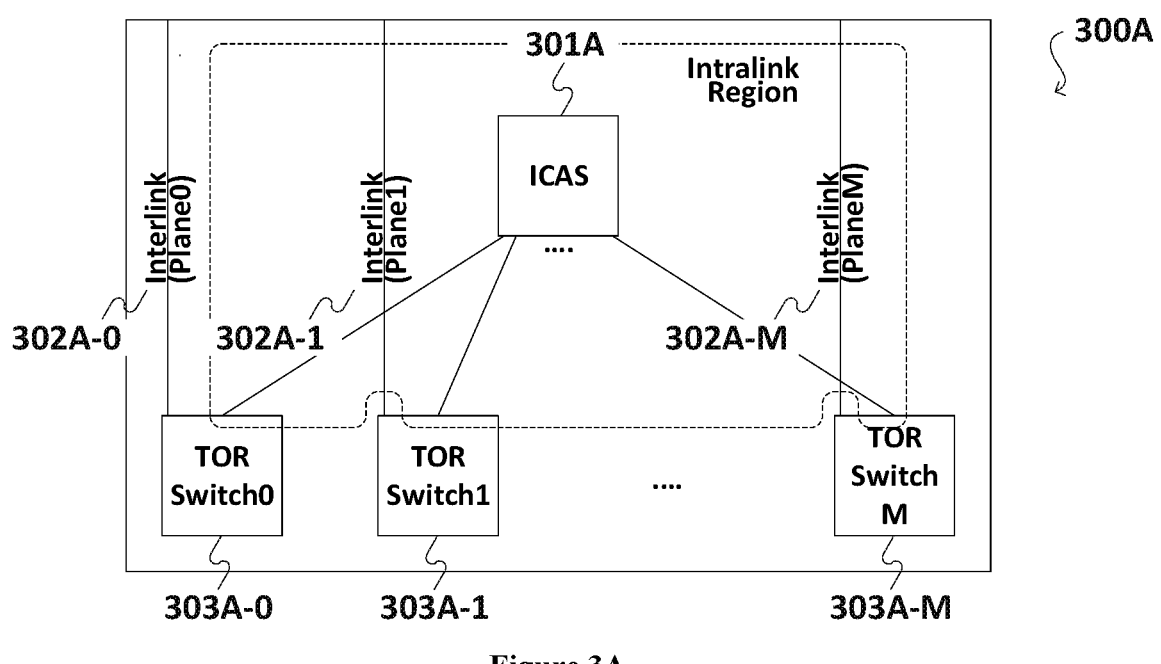
FIG. 3A illustrates a schematic block diagram of the ICAS-based datacenter pod.

Inspired from the above, a Mesh-based datacenter architecture was proposed as shown in FIG. 3A—"ICAS-based Datacenter Pod". ICAS (Interconnect as a Switch) is an internal terminology. The square box with "ICAS" on it is patented modular fabric chassis 301A. It has extra level of details but is basically a Mesh structure. It simplifies datacenter deployments by allowing point-to-point interconnects called intralinks 302A-0, 302A-1, . . . , 302A-M to connect from leaf switches (TOR switches) 303A-0, 303A-1, . . . , 303A-M to the modular fabric chassis 301A to form a Mesh structure.

Figure 3B:
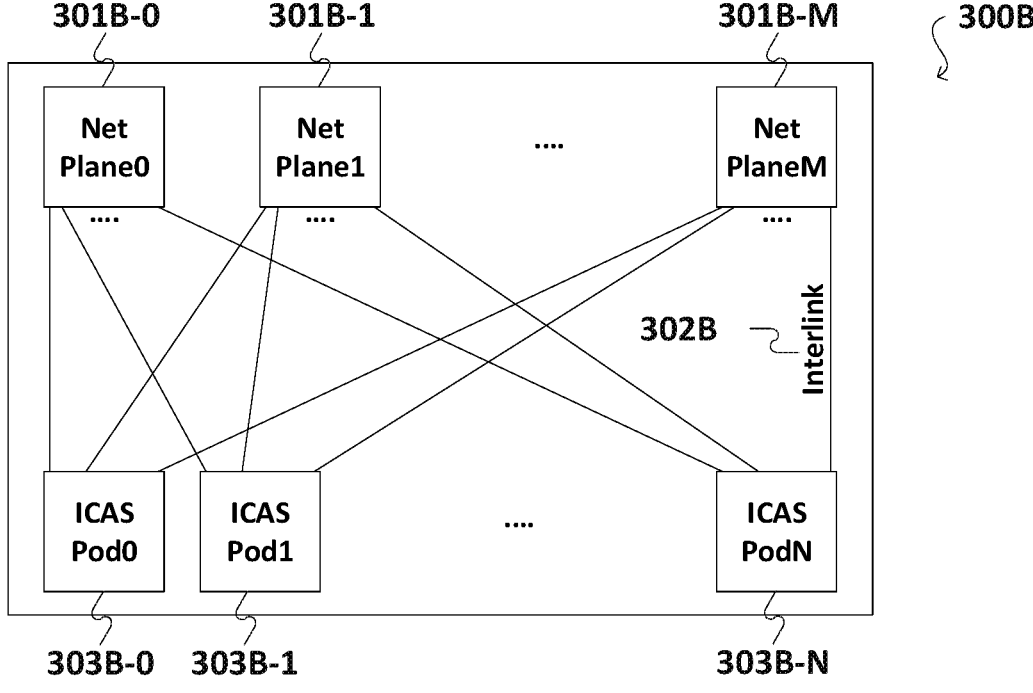
FIG. 3B illustrates a schematic block diagram of a Clos/Mesh+Mesh datacenter architecture.

Multiple of the ICAS-based Datacenter Pods 303B-0, 303B-1, . . . , 303B-N, can be interconnected by network planes (the Net Plane) 301B-0, 301B-1, . . . , 301B-M, as shown in FIG. 3B—"Clos/Mesh+Mesh Datacenter Architecture" to form bigger networks. Each of the squared box labeled with "Net Plane" is a place holder for extra level of network structure. In one example the network plane can be a simple Mesh (ICAS) structure or a simple Clos structure. In another example the network plane can include multiple layers of network structure such as switches from spine and core layers in Nvidia Selene DGX SuperPOD.

The key in designing the network plane is to optimize network infrastructure for workload to meet business objectives. In the case of Nvidia and Microsoft, the business objective is to optimize for workload of AI-Generated Content (AIGC). In the case of Amazon, the business objective is to optimize for workload from Cloud to AI/HPC computing.

A routing protocol is needed to expose the path diversity for the claimed Mesh-based architecture. Specifically, the Mesh-based architecture will need a routing protocol capable of performing multipath 2-hop dynamic routing to explore the richness of path diversity in the Mesh-based topology and benefit from improved congestion characteristics.

Existing routing protocol used in the datacenter, such as BGP, finds a shortest path to each of its neighbors due to the Dijkstra's algorithm, are not capable of performing multipath 2-hop dynamic routing on a Mesh topology. Furthermore, the BGP protocol is based on destination prefix. Meaning the prefix of the destination alone is used to determine the route path.

Figure 4:
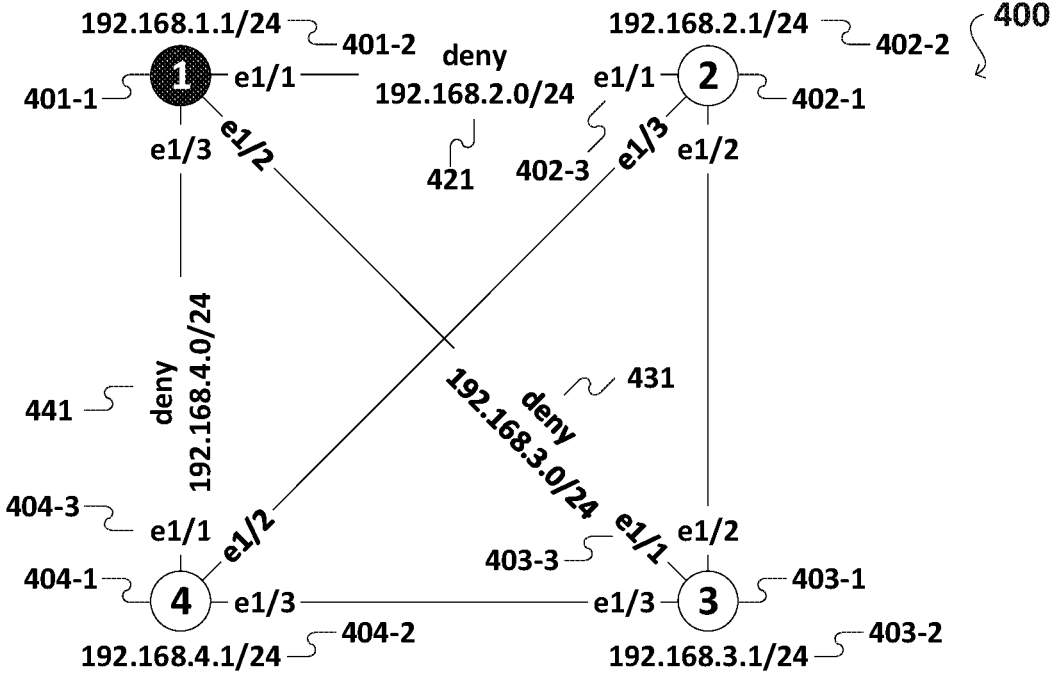
FIG. 4 illustrates a schematic diagram of BGP limitation in routing.

Let's illustrate the limitation of BGP (an exterior gateway protocol) performing multipath 2-hop dynamic routing in a 4-node full-mesh network. In FIG. 4—"BGP Limitation in Routing". Let's say node 1 401-1 is building its route table, where node 2 402-1 is advertising its prefix 192.168.2.0/24 402-2 through its interfaces but is blocked at the interface e1/1 402-3 due to an access control list (ACL) 421; node 3 403-1 is advertising its prefix 192.168.3.0/24 403-2 through its interfaces but is blocked at the interface e1/1 403-3 due to an access control list (ACL) 431; node 4 404-1 is advertising its prefix 192.168.4.0/24 404-2 through its interfaces but is blocked at the interface e1/1 404-3 due to an access control list (ACL) 441. At the end, node 1 401-1 learned multipath to node 2 402-1 (one path going through node 3 403-1, another path going through node 4 404-1), to node 3 403-1 (one path going through node 2 402-1, another path going through node 4 404-1), to node 4 404-1 (one path going through node 2 402-1, another path going through node 3 403-1). Node 2 402-1, node 3 403-1, node 4 404-1 also build their route tables, however, these route tables are single path routes-node 2 402-1 builds the shortest single route to node 3 403-1 and to node 4 404-1; node 3 403-1 builds the shortest single route to node 2 402-1 and to node 4 404-1; node 4 404-1 builds the shortest single route to node 2 402-1 and to node 3 403-1.

The above illustrates a problem but also reveals a partial solution by itself: Each node building its route table forms a standalone group to include the other nodes to advertise their prefixes. For example, for node 1 401-1 to build its route table, node 1 401-1 needs to form its group to include node 2 402-1, node 3 403-1, node 4 404-1 in the group to advertise their prefixes; for node 2 402-1 to build its route table, node 2 402-1 needs to form its group to include node 1 401-1, node 3 403-3, node 4 404-1 in the group to advertise their prefixes; for node 3 403-1 to build its route table, node 3 403-1 needs to form its group to include node 1 401-1, node 2 402-1, node 4 404-1 in the group to advertise their prefixes; for node 4 404-1 to build its route table, node 4 404-1 needs to form its group to include node 1 401-1, node 2 402-1, node 3 403-1 in the group to advertise their prefixes. Groups are isolated from each other. Group isolation can be provided by associating each group a dedicated virtual network such as VRF-lite (Virtual Routing and Forwarding lite).

Virtual Routing and Forwarding lite (VRF-lite) is a technology used in computer networking that allows multiple instances of a routing table and route process to coexist within a single network infrastructure. With VRF, multiple routing tables can coexist within a single router, and each VRF maintains its own separate routing table. This allows the router to make forwarding decisions based on the specific VRF context. VRF provides logical separation of network resources into virtual networks. Each VRF represents a virtual network or a routing domain, as if they are on separate physical routers. Interfaces on a router can be associated with a specific VRF, and traffic received or transmitted on that interface is processed within the context of the associated VRF. Each VRF maintains its own forwarding table derived from its routing table. When a packet arrives on an interface associated with a VRF, the router consults the appropriate VRF's forwarding table to determine how to forward the packet. VRF instances can run their own routing protocols independent of each other. This means that different virtual networks can use different routing protocols based on their requirements. By separating traffic into different virtual networks, VRF ensures that packets from one VRF cannot directly access or interfere with packets in another VRF. VTF is not new. Service providers have long been deploying VRF to create virtual private networks (VPNs) for each customer, maintaining separate routing tables and forwarding contexts. This allows customers to have their own private networks while sharing the underlying infrastructure.

Network tunneling technology refers to the use of one network protocol to transmit another network protocol, which mainly utilizes network tunneling protocols to achieve this function. Network tunneling protocols involve three network protocols: underlay protocol, encapsulation protocol, and overlay protocol. For example, the Layer 3 tunneling protocol encapsulates various overlay protocols, forming data packets that rely on the Layer 3 underlay protocols for routing between two endpoints of the networks. In network tunneling the address space of the overlay networks is completely hidden behind the endpoints of the underlay networks. This results in quite small the routing tables in the endpoints of the underlay networks. The tunneling technique can be used in the BGP-based 2-hop non-minimal routing on Mesh network to reduce the size of the routing tables of the underlay endpoints (the nodes) to practical size.

There is another technique to reduce routing table size of the underlay endpoints. By aggregating routes, the route table becomes smaller and more efficient, especially when dealing with networks that have numerous subnets.

The present invention relates to computer network in multipath 2-hop dynamic routing in a Mesh network. In particular the present invention defines a new transition route table structure to the existing IP route table the so called, primary route table, along with a routing scheme. The transition route table can optionally be implemented as a memory block separate from the IP route table in silicon to account for the increase of the memory. The new lookup table structure along with a routing scheme is meant to exploit the abundancy of path diversity in Mesh networks for low congestion network for the Cloud, and AI computing, and be interoperable to the existing routing technologies of the Cloud. To achieve this goal, the inventor chose to solve the long-lasting networking problem to do routing other than on the shortest path, i.e., the non-minimal routing, on a Mesh topology based on BGP protocol. Research shows the richness of the path diversity of the Mesh is available at the 2-hop route paths (non-minimal route paths) rather than the shortest paths (1-hop paths), and the network congestion diminishes much faster in the Mesh topology than in the Clos topology as the number of nodes become bigger. This is because the number of the non-overlapping paths grows much faster in Mesh than in Clos as shown in Table 1—"Maximum number of non-overlapping paths and diversity ratios of Clos and Mesh topologies".

It was shown in the previous section that the IP networks (the BGP) has limitation on performing multipath 2-hop dynamic routing in a 4-node full-mesh network. The attempt to build route tables for multipath 2-hop routes in Mesh network uncovers the limitation of the BGP but also reveals a solution. The solution consists of a new route table structure called transition route table and a routing scheme to do multipath 2-hop dynamic routing in an n-node Mesh network.

Figure 5:
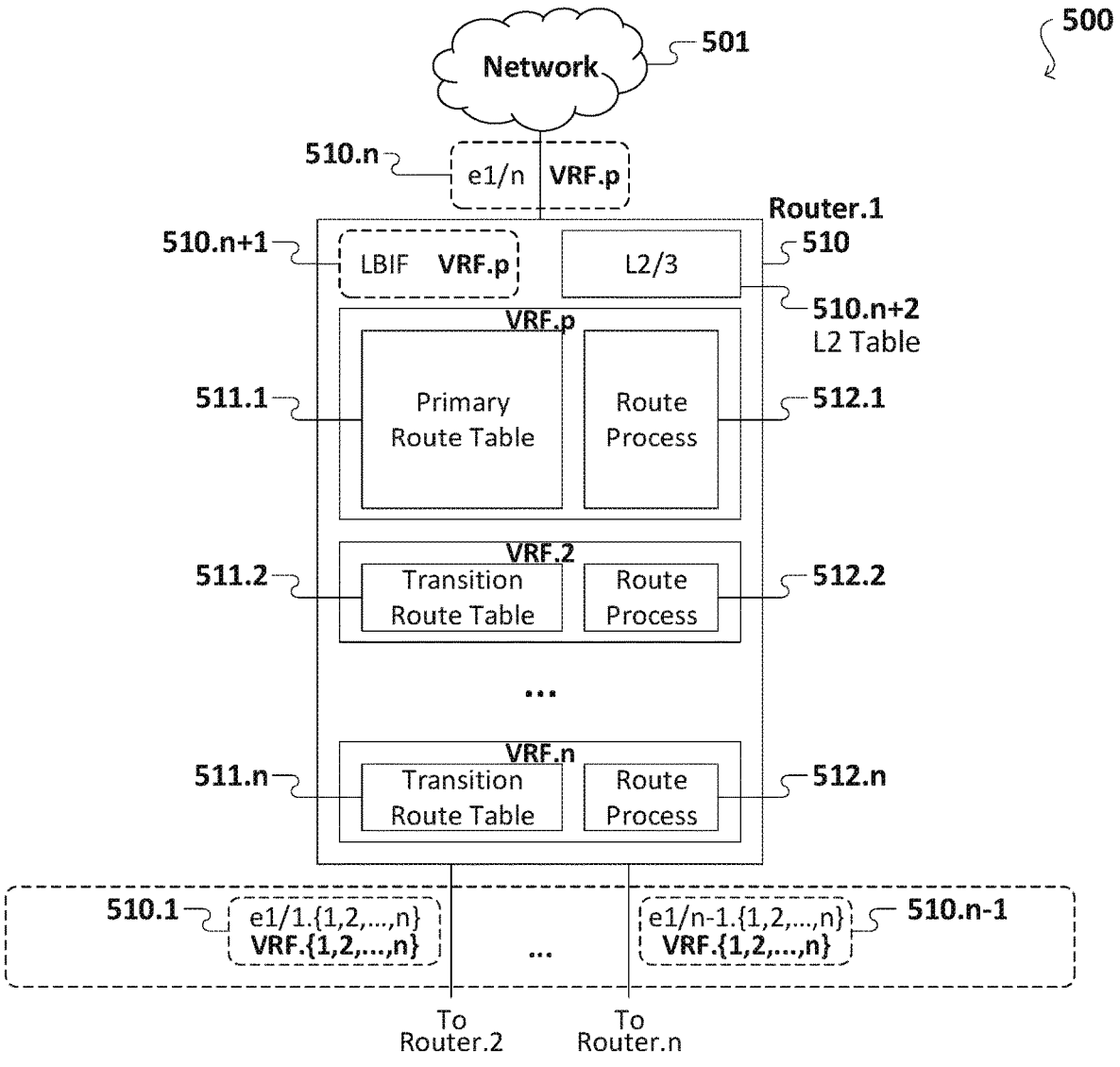
FIG. 5 illustrates a schematic block diagram of a router with constructs that is ready for non-minimal routing on regular IP networks according to one embodiment of the present disclosure.

The constructs of a node can be better shown in FIG. 5—"Router with Constructs Ready for Non-Minimal Routing on Regular IP Networks", where a node 510 has one primary route table 511.1 and an associated route process 512.1 both with VRF.p; and n−1 transition route tables and associated route processes, specifically from transition route table 511.2 associated with route process 512-2 both with VRF.2 to transition route table 511.n associated with route process 512-n both with VRF.n; where the VRF.p is with the primary route table and its associated route process, and VRF.i, $1 \le i \le n$, $i \ne p$ are each with one of the n−1 transition route tables and their associated route processes respectively. The node 510 has n−1 internal network interfaces 510.1, . . . , 510.n−1, each has n sub-interfaces e1/1. {1, 2, . . . , n} each with VRF. {1, 2, . . . , n}; the notation e1/1. {1, 2, . . . , n} is a set of interfaces, e.g., {e1/1.1, e1/1.2, . . . , e1/1.n} where e1/1.p the ".p" means it is with VRF.p virtual network, the notation VRF. {1, 2, . . . , n} is a notation of a set of VRFs, e.g., {VRF.1, VRF.2, . . . , VRF.n}. The node 510 also has an external network interface e1/n 510.n with VRF.p, a loopback interface LBIF 510.n+1 with VRF.p and a L2/3 functional block 510.n+2. The L2/3 functional block records the MAC addresses and the port from which the MAC addresses are learned. The L2/3 functional block also learns the correspondence of the remote tunnel end-point addresses and the MAC addresses behind each of the remote tunnel end-point addresses through protocol like EVPN. The number of the external network interface and the number of lookback interface are for illustration and there can be multiple of them in practice. The external network interface 510.n and the loopback interface 510.n+1 are with the same VRF.p as their primary route table 511.1 even there are multiple of these interfaces. The nodes are interconnected to each other by the internal network interfaces 510.1, . . . , 510.n−1 to form an n-node Mesh network. A virtual network consists of, under a VRF, the primary route table 511.1 and its associated route process 512.1, the external network interface 510.n, the internal lookback interface 510.n+1, the transition route tables from the other n−1 nodes under the same VRF and their associated route processes, and the associated n(n−1)/2 logical sub-interfaces under the same VRF.

Figure 12:
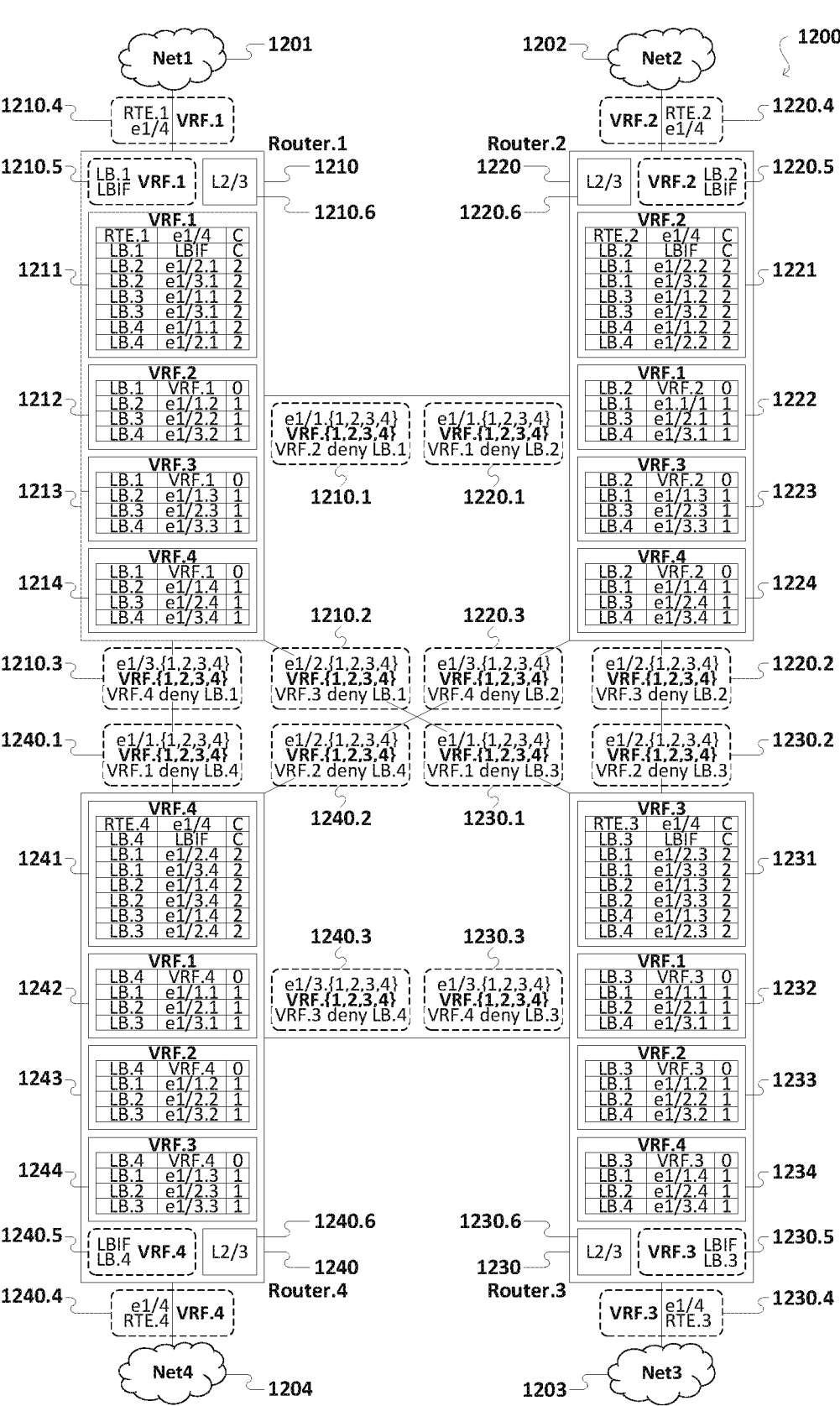
FIG. 12 illustrates the final route tables, according to one embodiment of the present disclosure.

An illustration of the workings of table lookup of a 4-node Mesh network is given in FIG. 12—"Final Route Tables". In this figure the route tables have been populated with prefixes of addresses (addresses of the Tunnel End-Points) from the 4 virtual networks. Network tunnels are assumed between each pair of nodes. The way the tunneling mechanism works in a network is briefly summarized here. A MP-BGP based protocol such as EVPN is usually used in each of the nodes to advertise the correspondence of L2 or L3 addresses behind the endpoint address to all other participating nodes, so that all the participating nodes know the correspondence of the L2 or L3 addresses behind the endpoint addresses of the destination nodes. In order to send workload to the destination, the workload is encapsulated with the destination endpoint address at the outer layer, and the destination endpoint address is used to route to the destination node. In the destination node, the workload is decapsulated, and the L2 or L3 address of the workload is used to forward/route to the external network connecting the destination node, specifically, in the case of layer 2 forwarding, the L2 destination address of the workload is used do a lookup in the L2/3 functional block to find the exit port to forward the workload; in the case of layer 3 routing, the L3 destination address of the workload is used to do a lookup in the primary route table to find the exit to route the workload.

In this case the external network of node 1 sends a workload to the external network of node 2 using the prefix PFX.2 behind the LB.2.

| Loopback Address (Tunnel End-point) | Prefixes or MAC addresses behind the Tunnel End-point |
| --- | --- |
| LB.1 | PFX.1 or MAC1 |
| LB.2 | PFX.2 or MAC2 |

The workload comes into node 1 1210 as a workload of VRF.1 since it goes through the external interface e1/4 of 1210.4 which is configured as VRF.1. Node 1 obtains the destination loopback address (the address of the tunnel end-point) LB.2 of 1220.5 of node2 1220 by doing a search using the L2 or L3 destination address of the workload, specifically, in the case where L2 over L3 tunneling is configured, the L2 destination address from the workload is used to search the L2/3 functional block to obtain the corresponding destination endpoint address; in the case where L3 over L3 tunneling is configured, the L3 destination address from the workload is used to search the L2/3 functional block to obtain the corresponding destination endpoint address. Then node 1 1210 encapsulates the workload using the destination endpoint address LB.2 of 1220.5 for routing. A lookup to the route table 1211 of VRF.1 produces multiple exit sub-interfaces-e1/2.1 of 1210.2 and e1/3.1 of 1210.3. This leads to multipath (2 paths) routing to the destination. Through Path 1: The workload is sent out from sub-interface e1/2.1 of 1210.2 of node 1 1210 to reach sub-interface e1/1.1 of 1230.1 of node 3 1230, from there a lookup on route table 1232 of VRF.1 of node 3 1230 produces single exit sub-interface e1/2.1 of 1232. The workload is sent out from sub-interface e1/2.1 of 1230.2 of node 3 1230 to reach sub-interface e1/2.1 of 1220.2 of node 2 1220, from node 2 1220 a lookup to route table 1222 of VRF.1 produces a single pointer of VRF.2 pointing to the route table 1221 of VRF.2 for additional table lookup to produce LBIF to signify reaching the end of the tunnel. Node 2 1220 does the decapsulates and recovers the workload. Node 2 1220 uses the L3 destination address from the workload to do a lookup to route table 1221 of VRF2 again or to do a layer 2 table lookup in the L2/3 functional block 1220 to obtain the exit interface e1/4 of 1220.4 of node 2 1220. Through the exit interface the workload is forwarded/routed to the external network Net2 1202. Through Path 2: The workload is sent out from sub-interface e1/3.1 of 1210.3 of node 1 1210 to reach sub-interface e1/1.1 of 1240.1 of node 4 1240, from there a lookup to route table 1242 of VRF.1 of node 4 1240 produces single exit sub-interface e1/2.1 of 1242. The workload is sent out from sub-interface e1/2.1 of 1240.2 of node 4 1240 to reach sub-interface e1/3.1 of 1220.3 of node 2 1220, from node 2 1220 a lookup to route table 1222 of VRF.1 produces a single pointer of VRF.2 pointing to the route table 1221 of VRF.2 for additional table lookup to produce LBIF to signify reaching the end of the tunnel. Node 2 1220 does the decapsulates and recovers the workload. Node 2 1220 uses the L3 destination address from the workload to do a lookup to route table 1221 of VRF2 again or to do a layer 2 table lookup in the L2/3 functional block 1220 to obtain the exit interface e1/4 of 1220.4 of node 2 1220. Through the exit interface the workload is forwarded/routed to the external network Net2 1202.

When a node receives a packet from its internal network interfaces, it is always one of the transition route tables with the matching VRF making the routing decision. So, why does the received workload from the internal network interfaces never have to go to the primary route table first for table lookup? The reason is because the transmit side of the source node and the receive side of the destination node are not on the same virtual network (are with different VRFs'). Contrary to the case of workload received from the internal network interfaces, workload received from the external network interfaces always go through the primary route table for table lookup because the primary route table and the external network interfaces are on the same VRF. Also, you may have noticed of the transition route tables in a node have two working scenarios. When the node is a transition node the result of the transition route table lookup finds the exit sub-interface to forward the workload to. In the case of destination node, the result of the transition route table lookup finds a pointer pointing to its primary route table for additional table lookup. The lookup in the primary route table produces a local port number to forward the workload to.

In a node the primary route table learns the port information from the directly connected interfaces in the same VRF, and this includes the external network interfaces, and the sub-interfaces of the internal network interfaces. Although the loopback interface does not have any physical appearance since it is a software only interface, its interface information is learned by the primary route table as well. When a specifically chosen prefix, this is usually the loopback address, is advertised in its VRF, the prefix is sent out through sub-interfaces to the virtual network with the same VRF in other n−1 nodes. And because the export/import network function is configured into the node, the prefix and the table information from the primary route table are redistributed to the n−1 transition route tables of n−1 different VRFs, and a pointer from each of the n−1 transition route tables is generated and pointing back to the primary route table for additional table lookup. In the illustration only the loopback address is advertised and get redistributed. The redistributed loopback addresses get advertised in the respective virtual networks (the respective VRFs') further. Route tables (the primary route table, the transition route tables) are built with the prefixes of the loopback addresses from a respective virtual network (the respective VRFs'). Configuring a single loopback address is often sufficient for a tunnel endpoint. A large IP address space can be concealed behind the tunnel endpoint's address, offering the benefits of minimizing the size of transition route tables. In later section a quantitative illustration of the route table size will be given. The loopback interface is preferred over the external network interface when building constructs like tunnel endpoints and BGP neighbors. The loopback interface is immune to accidental cable disconnection, which can happen to the external network interface, and remains much more stable as long as the node is operational. For those who are experienced in the field, it is understood that the prefix chosen for redistribution is not limited to the loopback address; the prefix from the network address of the directly connected external network interface can also be used to establish network communications.

In a virtual network, ACL are configured at the outputs of the sub-interfaces of the n−1 nodes (where the transition route table resides) having direct connection to the node (where the primary route table resides) to block prefix advertisements; the prefix advertisements go through the other sub-interfaces to reach the other nodes of the entire virtual networks. Both type of route tables is built by using the received prefix advertisements and the information of the sub-interface where the workload came in.

A step-by-step illustration of the buildup of the route tables of a 4-node Mesh network are given in the followings.

Figure 6:
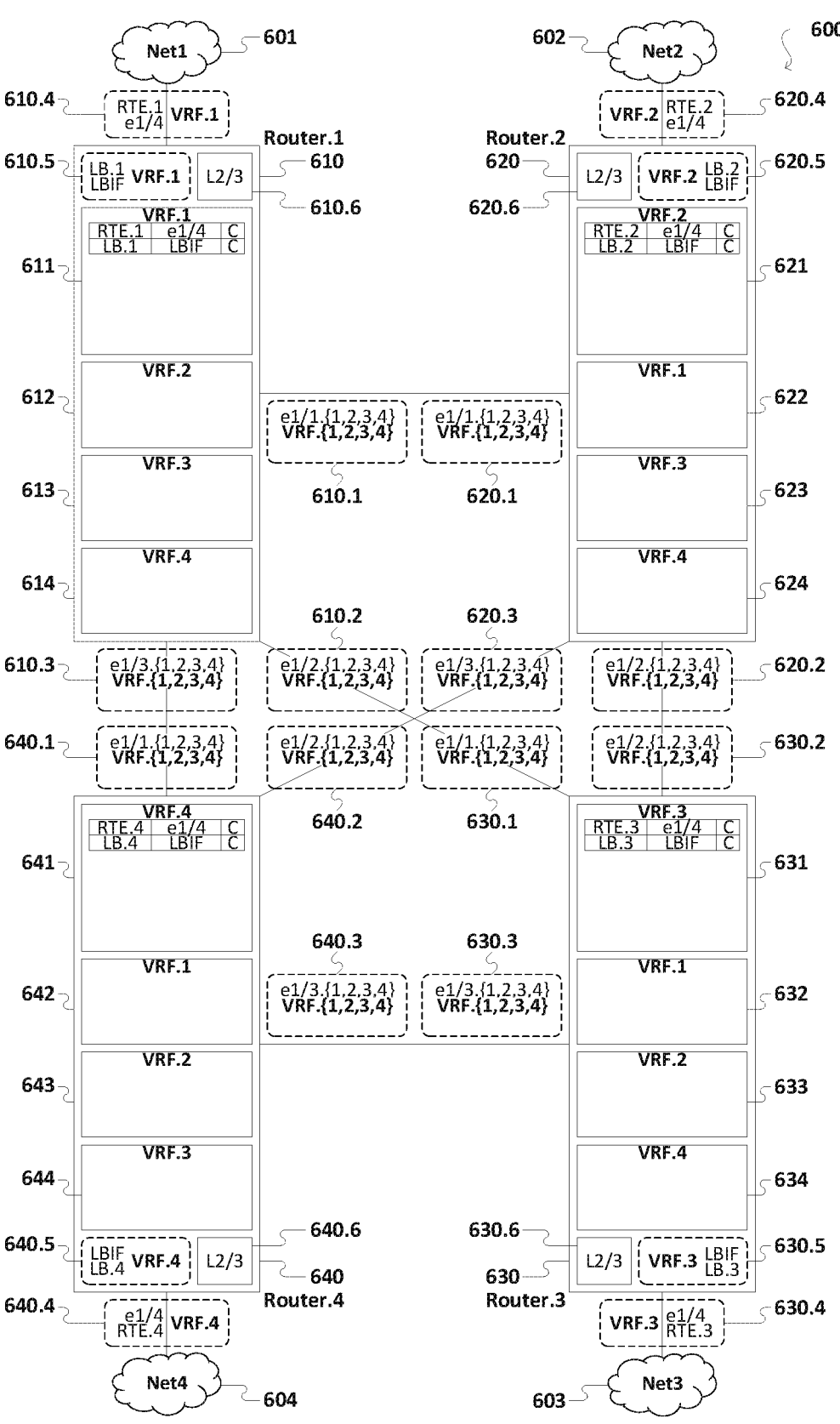
FIG. 6 illustrates a schematic block diagram of prefixes learning from local interfaces, according to one embodiment of the present disclosure.

FIG. 6—"Prefixes Learning from Local Interfaces" shows node 1 610, node 2 620, node 3 630, node 4 640 interconnected as a Mesh. The external network interface e1/4 of 610.4, the loopback interface LBIF of 610.5 of node 1 610 are configured to associate with VRF.1. The external network interface e1/4 of 620.4, the loopback interface LBIF of 620.5 of node 2 620 are configured to associate with VRF.2. The external network interface e1/4 of 630.4, the loopback interface LBIF of 630.5 of node 3 630 are configured to associate with VRF.3. The external network interface e1/4 of 640.4, the loopback interface LBIF of 640.5 of node 4 640 are configured to associate with VRF.4. The declaration of the local interfaces including the external network interfaces, the loopback interfaces, and the prefixes of these local interfaces in the configuration of the node creates corresponding route entries to the primary route table as shown, specifically, node 1 610 creates "RTE.1 e1/4 C" and "LB.1 LBIF C" entries to the primary route table 611 of VRF.1; node 2 620 creates "RTE.2 e1/4 C" and "LB.2 LBIF C" entries to the primary route table 621 of VRF.2; node 3 630 creates "RTE.3 e1/4 C" and "LB.3 LBIF C" entries to the primary route table 631 of VRF.3; node 4 640 creates "RTE.4 e1/4 C" and "LB.4 LBIF C" entries to the primary route table 641 of VRF.4.

Figure 7:
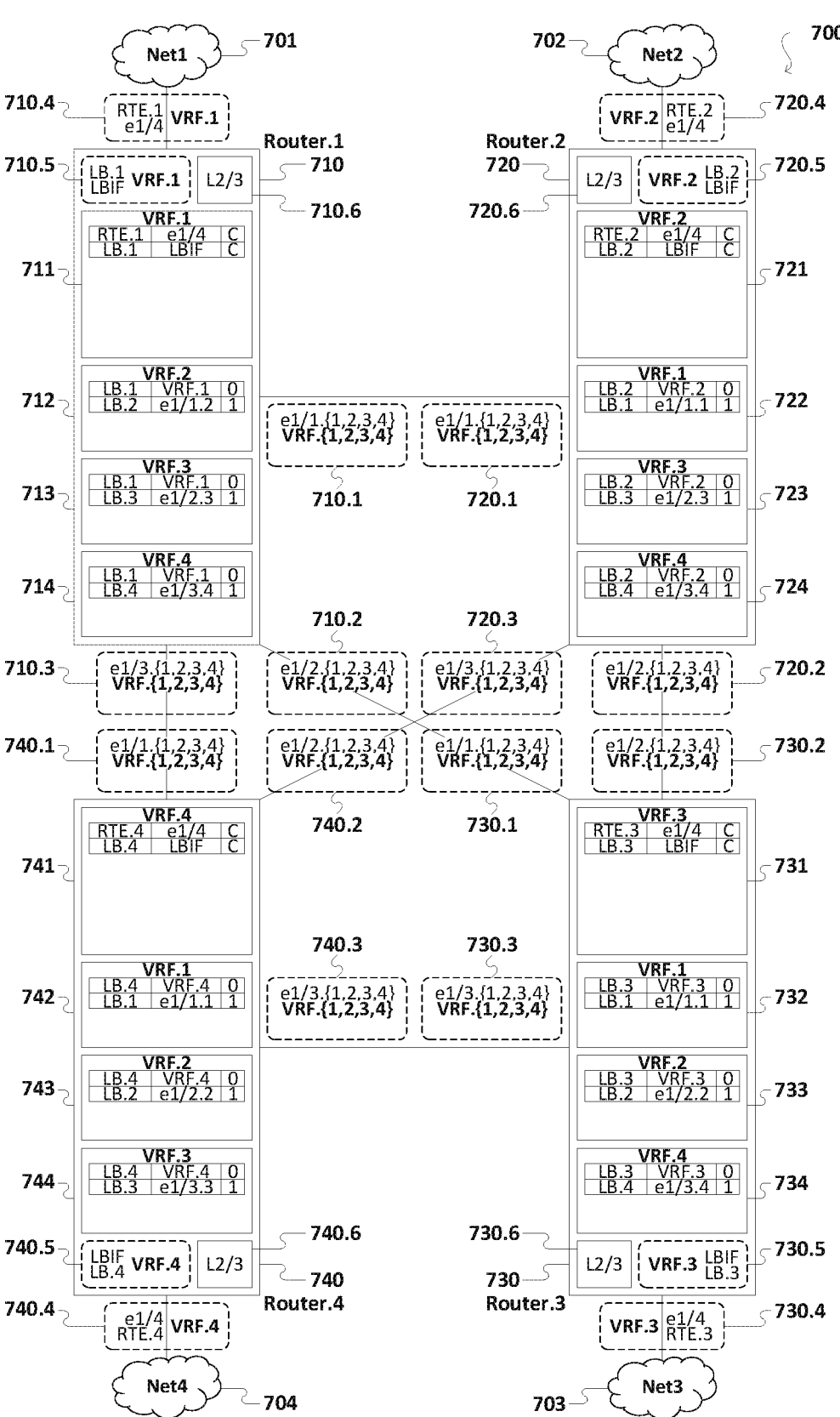
FIG. 7 illustrates a schematic block diagram of prefix redistributions within all nodes, according to one embodiment of the present disclosure.

In FIG. 7—"Initial Prefix Advertisement and Redistributions within all Nodes", only the prefix of a loopback address from each of the routers are specifically chosen to advertise and to leak to its transition route tables. The term "leaks" refers the process of exportation and importation of the prefix and related table pointer information. The initial prefix advertisement in each of the nodes allows the prefix to reach out to each of the external nodes. Specifically, the advertisement of the LB.1 prefix from the route entry "LB.1 LBIF C" of route table 711 of VRF.1 of node 1 710 enables the prefix LB.1 going through interface e1/1.1 of VRF.1 710.1 of node 1 710 to reach interface e1/1.1 720.1 of VRF.1 of node 2 720, and creates route entry "LB.1 e1/1.1 1" to route table 722 of VRF.1 of node 2 720; going through interface e1/2.1 of VRF.1 710.2 of node 1 710 to reach interface e1/1.1 730.1 of VRF.1 of node 3 730, and creates route entry "LB.1 e1/1.1 1" to route table 732 of VRF.1 of node 3 730; going through interface e1/3.1 of VRF.1 710.3 of node 1 710 to reach interface e1/1.1 740.1 of VRF.1 of node 4 740, and creates route entry "LB.1 e1/1.1 1" to route table 742 of VRF.1 of node 4 740. The initial prefix advertisement in each of the nodes, through export/import configuration setup, also triggers the redistribution of the prefix to reach the transition route tables in each of the nodes. Specifically, node 1 710 exports prefix LB.1 from entry "LB.1 LBIF C" in its primary route table 711 of VRF.1 while the transition route tables 712 of VRF.2, 713 of VRF.3 and 714 of VRF.4 import what was exported. This results in "LB.1 VRF.1 0" entry being created in transition route tables 712 of VRF.2, 713 of VRF.3 and 714 of VRF.4 each with a pointer VRF.1 to point back to the primary route table 711 for additional table lookup. Node 2 720, node 3 730, node 4 740 are going through the same process as the node 1 resulting in "LB.2 e1/1.2 1" created in transition route table 712 of VRF.2 of node 1 710, "LB.2 e1/2.2 1" created in transition route table 733 of VRF.2 of node 3 730, "LB.2 e1/2.2 1" created in transition route table 743 of VRF.2 of node 4 740, and resulting in "LB.2 VRF.2 0" entry being created in transition route tables 722 of VRF.1, 723 of VRF.3 and 724 of VRF.4 each with a pointer VRF.2 to point back to the primary route table 721 of VRF.2 for additional table lookup; resulting in "LB.3 e1/2.3 1" created in transition route table 713 of VRF.3 of node 1 710, "LB.3 e1/2.3 1" created in transition route table 723 of VRF.3 of node 2 720, "LB.3 e1/3.3 1" created in transition route table 744 of VRF.4 of node 4 740, and resulting in "LB.3 VRF.3 0" entry being created in transition route tables 732 of VRF.1, 733 of VRF.2 and 734 of VRF.4 each with a pointer VRF.3 to point back to the primary route table 731 of VRF.3 for additional table lookup; resulting in "LB.4 e1/3.4 1" created in transition route table 714 of VRF.4 of node 1 710, "LB.4 e1/3.4 1" created in transition route table 724 of VRF.4 of node 2 720, "LB.4 e1/3.4 1" created in transition route table 734 of VRF.4 of node 4 740, and resulting in "LB.4 VRF.4 0" entry being created in transition route tables 742 of VRF.1, 743 of VRF.2 and 744 of VRF.4 each with a pointer VRF.4 to point back to the primary route table 741 of VRF.4 for additional table lookup.

Figure 8:
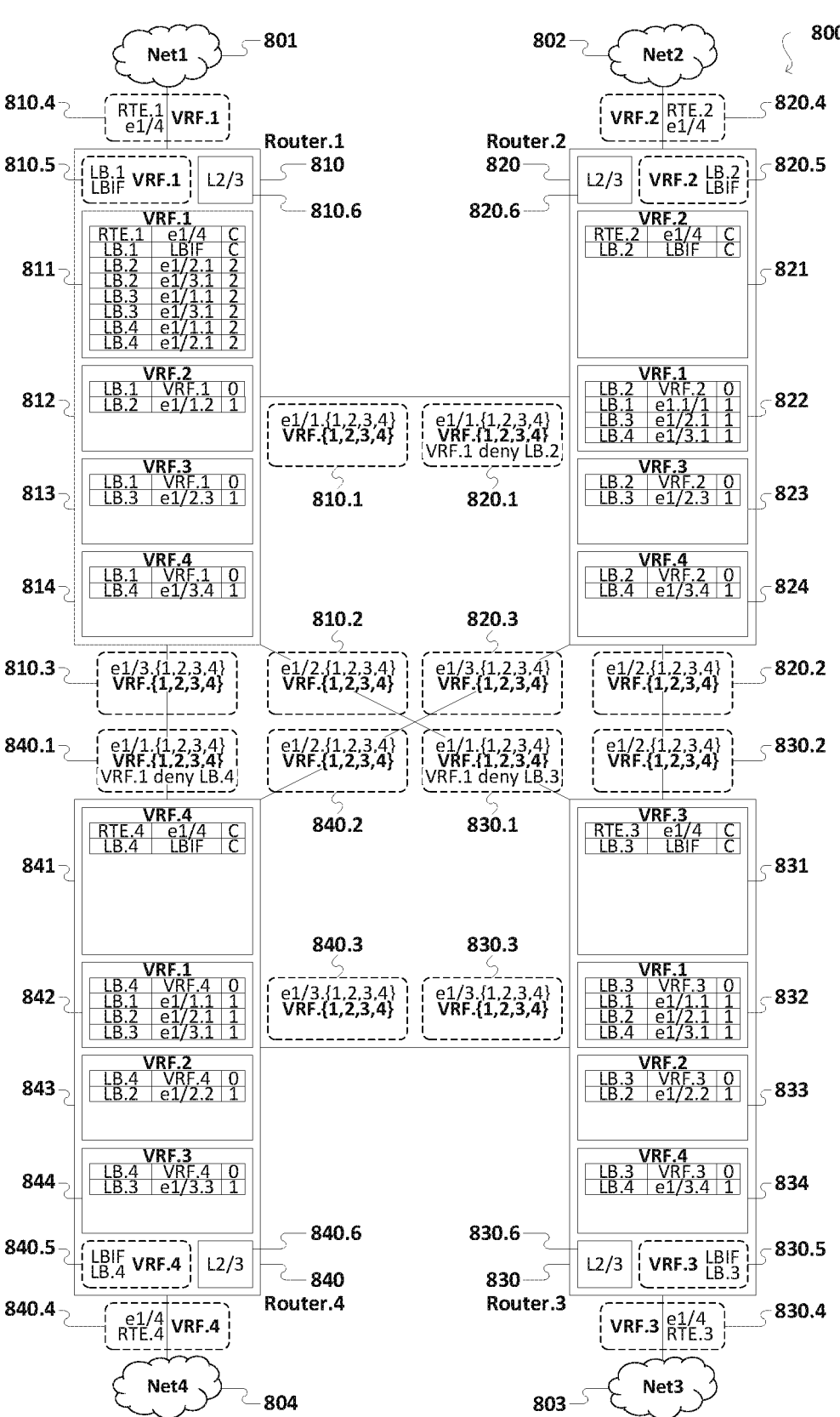
FIG. 8 illustrates a schematic block diagram of prefix announcements and route table formations in VRF.1, according to one embodiment of the present disclosure.

FIG. 8—"Prefix Advertisements in VRF.1" illustrates how the route tables of nodes in virtual network VRF.1 are built, particularly how the primary route table 811 of VRF.1 of node 1 810, transition route table 822 of VRF.1 of node 2 820, transition route table 832 of VRF.1 of node 3 830, and transition route table 842 of VRF.1 of node 4 840 are built. Be noted that the LB.1 prefixes in route entries of route table 822, 832 and 842 were created from LB.1 prefix advertisement from route table 811 of VRF.1 of node 1 810, already carrying the smaller hot count, will not accept update of the same prefix of LB.1 from other transition route tables. After the prefix has been redistributed to the transition route tables, specifically, the transition route table 822 of VRF.1 in node 2 820, the transition route table 832 of VRF.1 in node 3, the transition route table 842 of VRF.1 in node 4 840, additional prefix advertisements are triggered to send prefix LB.2 from entry "LB.2 VRF.2 0" of transition route table 822 through sub-interface e1/2.1 of 820.2 of VRF.1 of node 2 820 to reach sub-interface e1/2.1 of 830.2 of VRF.1 of node 3 830, and through sub-interface e1/3.1 of 820.3 of VRF.1 of node 2 820 to reach sub-interface e1/2.1 of 840.2 of VRF.1 of node 4 840 except sub-interface e1/1.1 of 820.1 of VRF.1 of node 2 820 since ACL "VRF.1 deny LB.2" is configured to block prefix advertisement of LB.2; to send prefix LB.3 from entry "LB.3 VRF.3 0" of transition route table 832 through sub-interface e1/2.1 of 830.2 of VRF.1 of node 3 830 to reach sub-interface e1/2.1 of 820.2 of VRF.1 of node 2 820, and through sub-interface e1/3.1 of 830.3 of VRF.1 of node 3 830 to reach sub-interface e1/3.1 of 840.3 of VRF.1 of node 4 840 except, sub-interface e1/1.1 of 830.1 of VRF.1 of node 3 830 since ACL "VRF.1 deny LB.3" is configured to block prefix advertisement of LB.3; to send prefix LB.4 from entry "LB.4 VRF.4 0" of transition route table 842 through sub-interface e1/2.1 of 840.2 of VRF.1 of node 4 840 to reach sub-interface e1/3.1 of 820.3 of VRF.1 of node 2 820, and through sub-interface e1/3.1 of 840.3 of VRF.1 of node 4 840 to reach sub-interface e1/3.1 of 830.3 of VRF.1 of node 3 830 except, sub-interface e1/1.1 of 840.1 of VRF.1 of node 4 840 since ACL "VRF.1 deny LB.4" is configured to block prefix advertisement of LB.4. Node 2 820 receives LB.3 prefix advertisement through sub-interface e1/2.1 of 820.2 of VRF.1 and LB.4 prefix advertisement through sub-interface e1/3.1 of 820.3 of VRF.1; two route entries "LB.3 e1/2.1 1" and "LB.4 e1/3.1 1" are built in the route table 822 of VRF.1 respectively. The prefix advertisements received get advertised further through other sub-interfaces. Both prefixes LB.3 from entry "LB.3 e1/2.1 1" and LB.4 from entry "LB.4 e1/3.1 1" of transition route table 822 of VRF.1 of node 2 820 are advertised through sub-interface e1/1.1 of 820.1 of VRF.1 of node 2 820 to reach sub-interface e1/1.1 of 810.1 of VRF.1 of node 1 810. And route entries "LB.3 e1/1.1 2" and "LB.4 e1/1.1 2" are built into the primary route table 811 of VRF.1 of node 1 810. However, both of the prefixes LB.3 from entry "LB.3 e1/2.1 1" and LB.4 from entry "LB.4 e1/3.1 1" of the transition route table 822 of VRF.1 of node 2 820 could not get accepted into transition route table 832 of VRF.1 of node 3 830 and could not get accepted into transition route table 842 of VRF.1 of node 4 840 because existing route entries have smaller hop counts. Node 3 830 receives LB.2 prefix advertisement through sub-interface e1/2.1 of 830.2 of VRF.1 and LB.4 prefix advertisement through sub-interface e1/3.1 of 830.3 of VRF.1, two route entries "LB.2 e1/2.1 1" and "LB.4 e1/3.1 1" are built in the route table 832 of VRF.1 respectively. The prefix advertisements received get advertised further through other sub-interfaces. Both prefixes LB.2 from entry "LB.2 e1/2.1 1" and LB.4 from entry "LB.4 e1/3.1 1" of transition route table 832 of VRF.1 of node 3 830 are advertised through sub-interface e1/1.1 of 830.1 of VRF.1 of node 3 830 to reach sub-interface e1/2.1 of 810.2 of VRF.1 of node 1 810. And route entries "LB.2 e1/2.1 2" and "LB.4 e1/2.1 2" are built into the primary route table 811 of VRF.1 of node 1 810. However, both of the prefixes LB.2 from entry "LB.2 e1/2.1 1" and LB.4 from entry "LB.4 e1/3.1 1" of the transition route table 832 of VRF.1 of node 3 830 could not get accepted into transition route table 822 of VRF.1 of node 2 820 and could not get accepted into transition route table 842 of VRF.1 of node 4 840 because existing route entries have smaller hop counts. Node 4 840 receives LB.2 prefix advertisement through sub-interface e1/2.1 of 840.2 of VRF.1 and LB.3 prefix advertisement through sub-interface e1/3.1 of 840.3 of VRF.1, two route entries "LB.2 e1/2.1 1" and "LB.3 e1/3.1 1" are built in the route table 842 of VRF.1 respectively. The prefix advertisements received get advertised further through other sub-interfaces. Both prefixes LB.2 from entry "LB.2 e1/2.1 1" and LB.3 from entry "LB.3 e1/3.1 1" of transition route table 842 of VRF.1 of node 4 840 are advertised through sub-interface e1/1.1 of 840.1 of VRF.1 of node 4 840 to reach sub-interface e1/3.1 of 810.3 of VRF.1 of node 1 810. And route entries "LB.2 e1/3.1 2" and "LB.3 e1/3.1 2" are built into the primary route table 811 of VRF.1 of node 1 810. However, both of the prefixes LB.2 from entry "LB.2 e1/2.1 1" and LB.3 from entry "LB.3 e1/3.1 1" of the transition route table 842 of VRF.1 of node 4 840 could not get accepted into transition route table 822 of VRF.1 of node 2

820 and could not get accepted into transition route table 832 of VRF.1 of node 3 830 because existing route entries have smaller hop counts.

Figure 9:
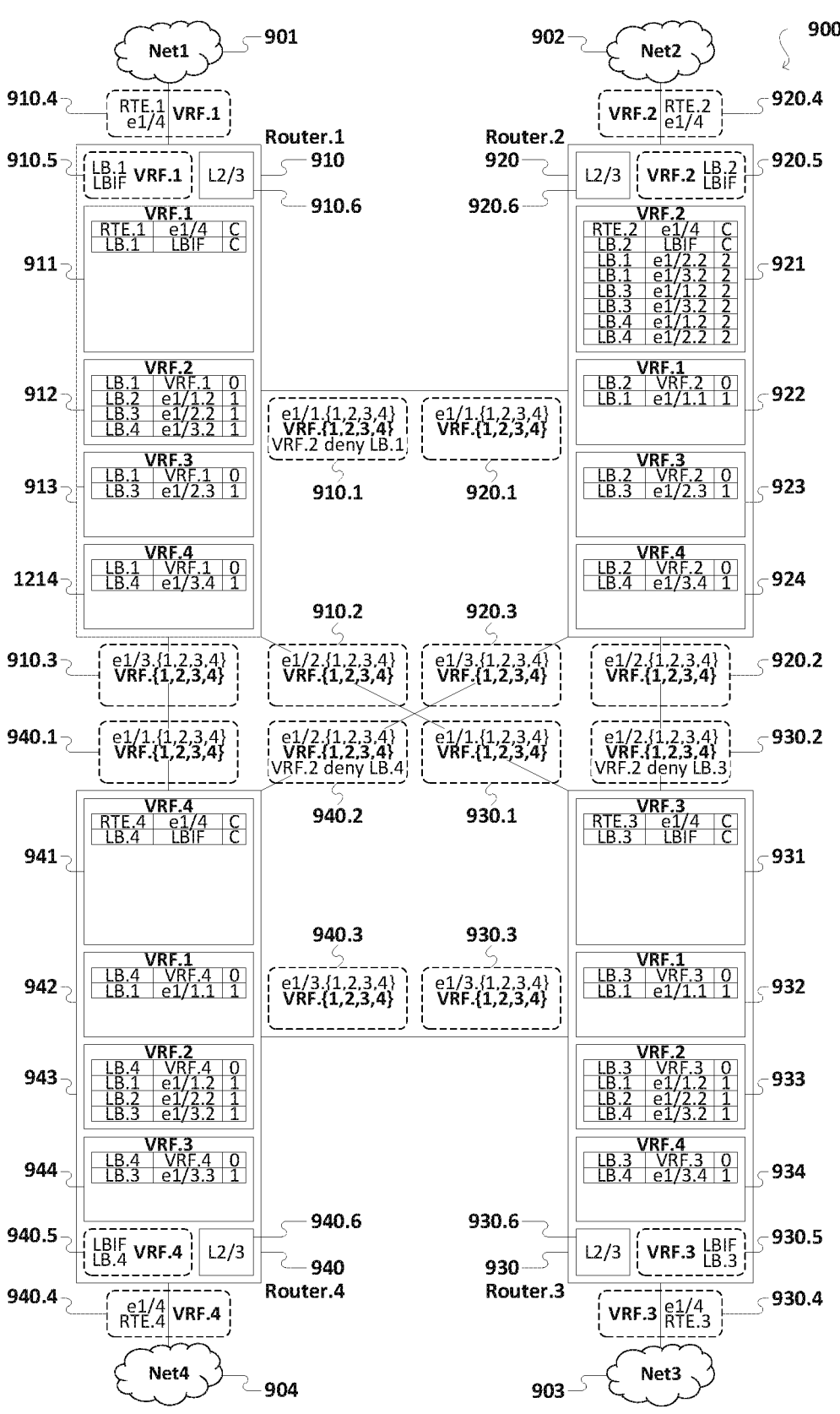
FIG. 9 illustrates a schematic block diagram of prefix announcements and route table formations in VRF.2, according to one embodiment of the present disclosure.
Figure 10:
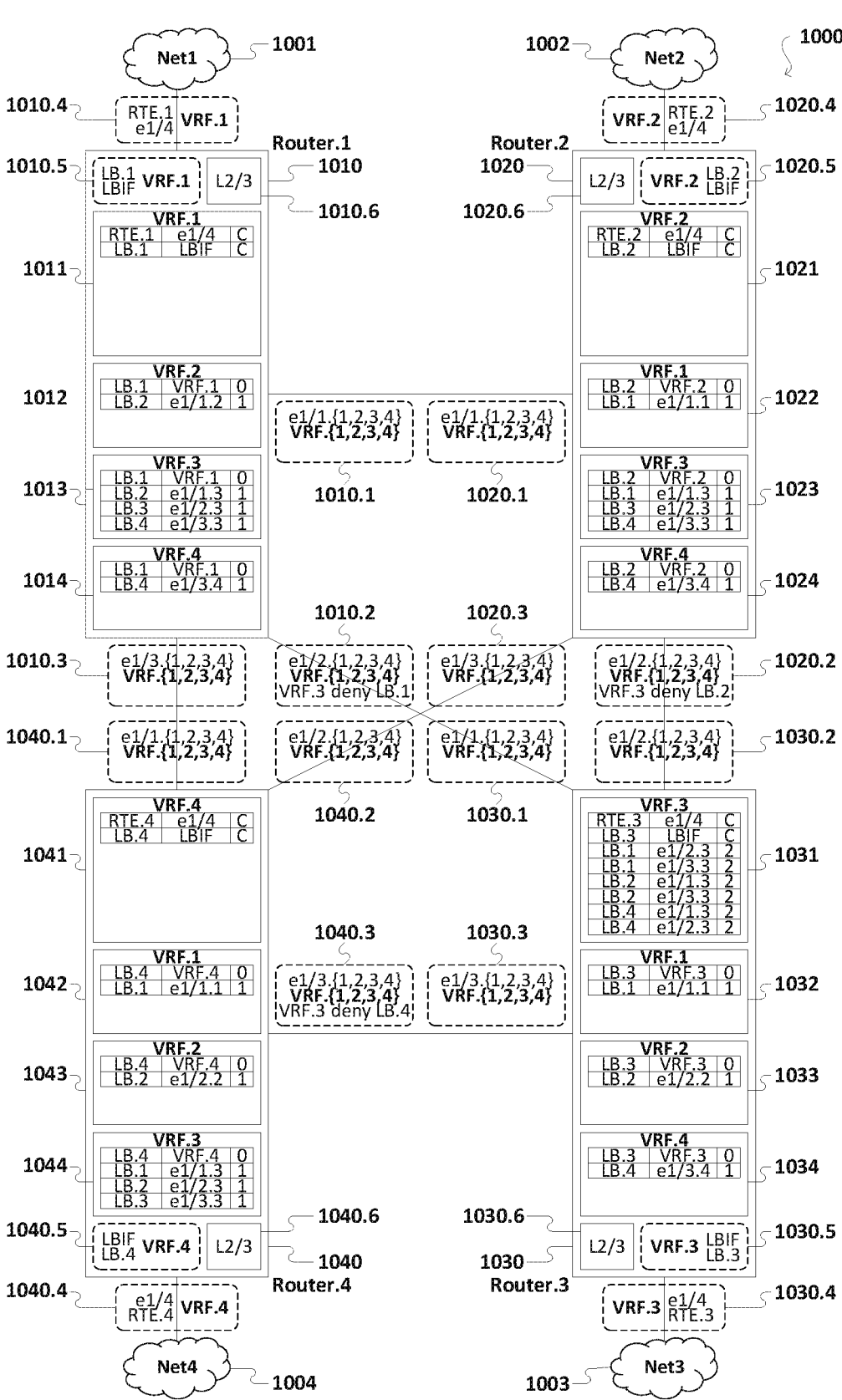
FIG. 10 illustrates a schematic block diagram of prefix announcements and route table formations in VRF.3, according to one embodiment of the present disclosure.
Figure 11:
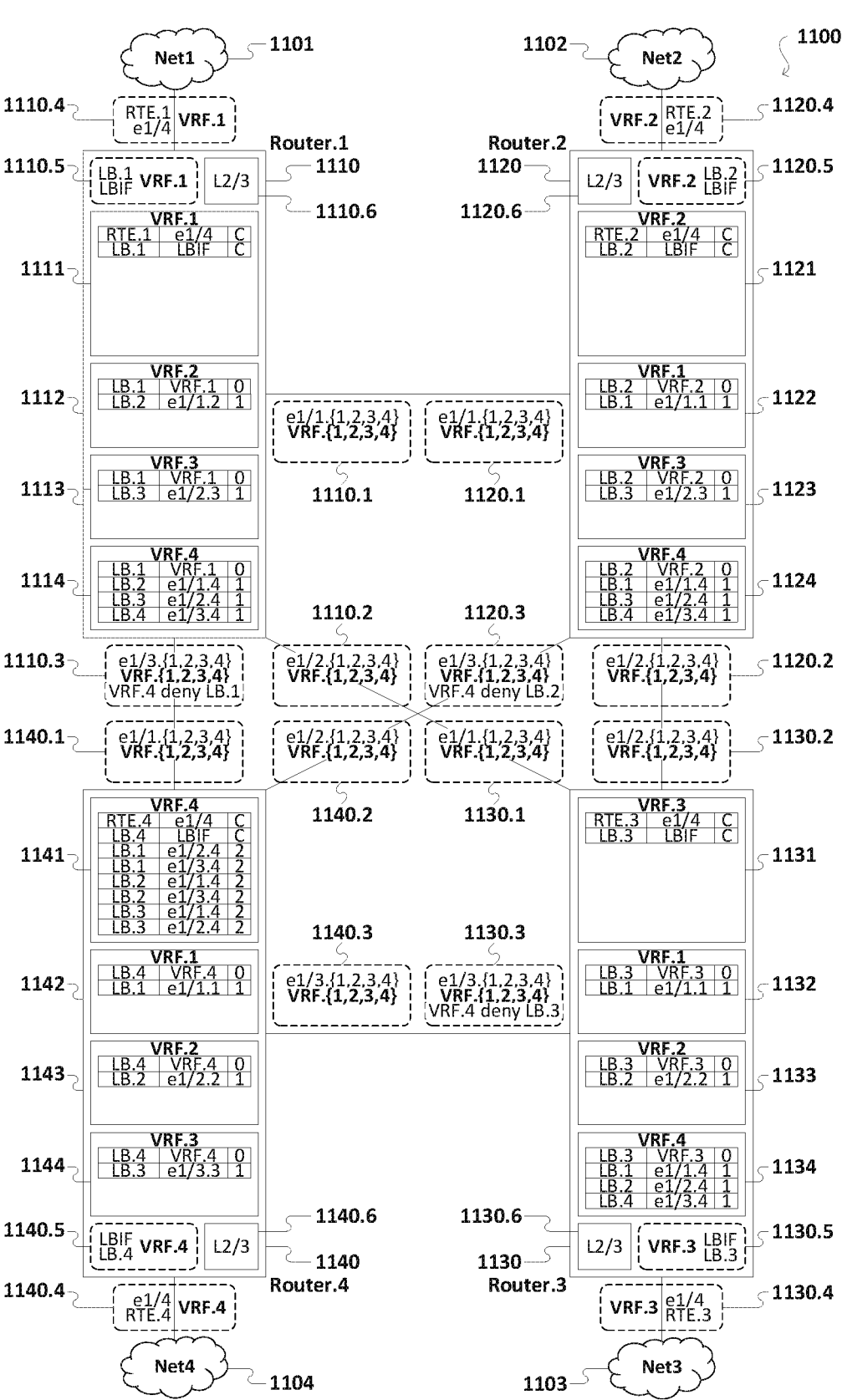
FIG. 11 illustrates a schematic block diagram of prefix announcements and route table formations in VRF.4, according to one embodiment of the present disclosure.

FIG. 9—"Prefix Advertisements in VRF.2", FIG. 10—"Prefix Advertisements in VRF.3" and FIG. 11—"Prefix Advertisements in VRF.4" illustrate how the route tables of nodes in virtual network VRF.2, VRF.3 and VRF.4 get built. The processes are the same as in VRF.1, and their details are omitted. At last the route tables with all route entries built is show in FIG. 12—"Final Route Tables".

The major steps to prepare an n-node Mesh network to do multipath 2-hop dynamic routing can be summarized in the following steps:

1) Each node along with its internal network interfaces, is partitioned into multiple virtual networks identified by VRF.p where $p \in \{1, 2, 3, \ldots, n\}$.

2) From within a node, assign a VRF.p to the primary route table, the loopback interface(s) and the directly connected external network interface(s). (Usually, the node number and the VRF number for the primary route table are made the same.)

3) From within a node advertise the selected prefix(es), often time this is the prefix of an loopback address, within the virtual network where the primary route table belongs, and through export/import configuration to the node, the prefix advertisement also triggers the redistribution of the prefix(es) to each of the transition route tables of VRF.t, $t \in \{t \neq p | 1, 2, 3, \ldots, n\}$, so that the prefix(es) will be advertised by the BGP processes operating in the respective virtual networks of VRF.t 4) From within a node, ACL prefix filtering to block prefix advertisement is configured at the outgoing sub-interface of the node where the transition route tables of VRF.s resides connecting the node where the primary route table of VRF.s resides in each of the virtual networks of VRF.s, $s \in \{1, 2, 3, \ldots, n\}$. This ensures that prefixes are advertised through other interfaces of the node and creates routes of equal-cost paths.

While the present invention depicts the operation of the invention as a tunneled network. For instance, each of the tunnel endpoints incorporates a tunnel functional block responsible for encapsulating and decapsulating the overlay workload, while underlay IP routing between these tunnel endpoints is facilitated through the use of loopback addresses as prefixes for routing. Someone well-versed in the field may also consider an alternative approach where the connected external network interface functions as an entry point and the endpoint serves as the next hop using static route. Someone well-versed in the field may also consider another alternative approach where the endpoint is a connected external network interface, and IP aggregation switch/router is placed behind the endpoint to hide various prefixes from the external networks.

Figure 13:
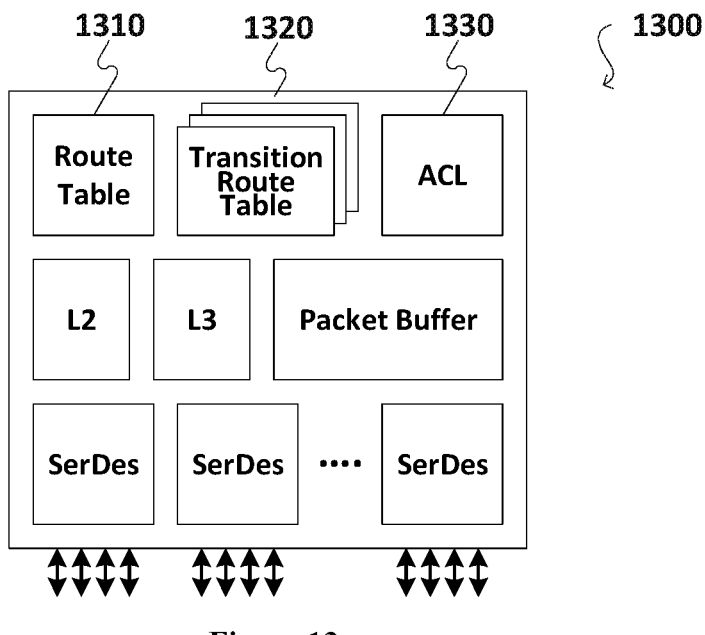
FIG. 13—illustrates a switch silicon block diagram where the primary route table and transition route tables are supported in separate memory blocks, according to one embodiment of the present disclosure.

Although the present invention can be implemented in NOS (Network Operating systems) software on off-the-shell switch component, for those skilled in the art would understand, it can be advantageous to support the Transition Route Tables 1320 separate from the primary route table 1310 on switch silicon 1300 as show in FIG. 13—Switch Silicon Block Diagram. There are several reasons for this. The number of the route table entries increases as the nodes increase in the Mesh network supporting multipath 2-hop dynamic routing. The silicon design may choose to implement a separate memory block minimizing the changes from the original route table to account for the additional memory for the Transition Route Table. A separate memory block for the Transition Route Table can also offload table lookup bandwidth from the primary route table.

TABLE 4

| | | Supercomputer/ | Cloud & AI |
| | Cloud | HPC/AI | Computing |
| --- | --- | --- | --- |
| Topologies | Clos | Torus, Hypercube, | Clos + Mesh |
| | | Dragonfly, Clos | |
| Routing | BGP | Fat-Tree, Up/Down | BGP + VRF |
| Technologies | Ethernet/IP | Infiniband | Ethernet/IP |

Attributes of Cloud and AI Computing and its Predecessors

Detailed illustrations depicting the increase in route table size due to non-minimal routing (the 2-hop routing) are provided below.

Before we begin, we need to be aware the sweet spot of the practical network size by understanding the limitations of the state-of-the-art switching device. First, the commercial Ethernet switches are able to support around 1.6 million route table entries. White box Ethernet switch with open source SONIC can support 500K route table entries without much problem. Second, in many high-performance datacenter Ethernet switches, route table entries are highly optimized for memory efficiency and fast routing lookups. These switches often use binary trie or similar data structures to represent routing tables efficiently. A trie (derived from retrieval) is a multiway tree data structure used for storing strings over an alphabet. It is used to store a large number of strings. The pattern matching can be done efficiently using tries. In average 192-bit per route table entry is used for approximation in IPv4 (Destination Network Address/32 bits, Subnet Mask or Prefix Length/32 bits, Next Hop IP Address/32 bits, Interface/16 bits, Metric or Cost/16 bits, Route Type and Flags/16 bits, Administrative Distance/16 bits, Timestamp or Age/32 bits) (or 512-bit per route table entry is used for proximation in IPv6). Third, current generation of datacenter switching ASICs support up to 256 VRFs. This sets a limit of 256-node to a single Mesh network at present time. Lastly, the latest commercial Ethernet switches support up to 256 ports (256 Ethernet MAC after port breakout). This sets a limit of less than 128-node to a single Mesh network depending on the supported workload and the network architecture chosen. To build a much larger network, a single n-node Mesh network will be designed to fit in a network pod as in FIG. 3A—"ICAS-based Datacenter Pod", and many of these network pods will be interconnected by network planes as in FIG. 3B—"Clos/Mesh+Mesh Datacenter Architecture".

Table 5—"Route Table Size Increment in an N-node Mesh Network where Single Endpoint/Lookback Address is Used (prefix, p=1)" illustrates the route table sizes (the combined number of route entries of the primary route table and the transition route table) increase as the number of network nodes increase in an n-node Mesh network.

TABLE 5

Route Table Size Increment in an N-node Mesh Network where Single Lookback Address/Endpoint is Used (prefix, p = 1).

| Nodes (n) | Primary Table Entries $p[1 + (n - 1)(n - 2)]$, p = 1 | Transition Table Entries $p[n(n - 1)]$, p = 1 | Total Route Table Size Increases (MB) |
| --- | --- | --- | --- |
| 4 | 7 | 12 | 0.003 |
| 8 | 43 | 56 | 0.02 |
| 16 | 211 | 240 | 0.08 |
| 24 | 507 | 552 | 0.19 |
| 32 | 931 | 992 | 0.35 |
| 40 | 1,483 | 1,560 | 0.56 |

TABLE 5-continued

Route Table Size Increment in an N-node Mesh Network where Single Lookback Address/Endpoint is Used (prefix, p = 1).

| Nodes (n) | Primary Table Entries $p[1 + (n - 1)(n - 2)]$, p = 1 | Transition Table Entries $p[n(n - 1)]$, p = 1 | Total Route Table Size Increases (MB) |
| --- | --- | --- | --- |
| 48 | 2,163 | 2,256 | 0.81 |
| 56 | 2,971 | 3,080 | 1.11 |
| 64 | 3,907 | 4,032 | 1.45 |
| 72 | 4,971 | 5,112 | 1.85 |
| 80 | 6,163 | 6,320 | 2.29 |
| 88 | 7,483 | 7,656 | 2.77 |
| 96 | 8,931 | 9,120 | 3.31 |
| 104 | 10,507 | 10,712 | 3.89 |
| 112 | 12,211 | 12,432 | 4.51 |
| 120 | 14,043 | 14,280 | 5.19 |
| 128 | 16,003 | 16,256 | 5.91 |
| 256 | 64,771 | 65,280 | 23.81 |
| 384 | 146,307 | 147,072 | 53.72 |
| 512 | 260,611 | 261,632 | 95.63 |

Given the constraints of current switching silicon and switching devices, a practical range comprising 32 to 96 nodes (switching devices such as Top-of-Rack or leaf switches) configured in a datacenter Mesh network pod can be expected, and it requires only a small percentage of extra route table entries to function effectively.

In summary, the Mesh-based network has many folds of path diversity than the Clos counterpart, and incurs less network congestion. The Mesh-based network has good scalability as both of its Mesh-to-Clos path diversity ratio grow linearly and its network congestion diminishes inversely with the increase of the network size. The value of the present invention is reflected in two aspects. For the Cloud, the present invention brings low congestion high bandwidth non-minimal routing scheme commonly found in supercomputer/HPC/AI to the cloud infrastructure. Since the core of the multipath 2-hop dynamic routing is essentially based on BGP, it is 100% interoperable to the current Cloud deployments worldwide. For the supercomputer/HPC/AI, the present invention brings in a novel non-minimal routing scheme for Mesh-based topology unfound in the supercomputer/HPC/AI computing, and is capable of uncovering the rich path diversity (2-hop) in the Mesh. The invention can easily be adopted by either industry—the Cloud or supercomputer/HPC/AI computing. And has the potential to converge the Cloud and AI Computing network infrastructure as one; with the continuous break-throughs in the routing technologies, Cloud and supercomputer/HPC/AI computing share a common base to leverage the Cloud infrastructure for scalability, agility, resiliency, security, automation, and cost-efficiency; and to leverage the supercomputer/HPC/AI computing infrastructure for low congestion, low latency for computing.

Although the present disclosure provides a method to do non-minimal routing on n-node mesh network, for someone skilled in the art, the underlying principles of the method can be applied to other structured network topologies such as Hypercube, Torus and Mesh, Dragonfly, PolarFly, Dual-Rail, Butterfly, D-Cell, Spine-and-Leaf, Clos Fabric without losing its essential concept.

While particular elements, embodiments, and applications of the present disclosure have been shown and described, it is understood that the disclosure is not limited thereto because modifications may be made by those skilled in the art, particularly in light of the foregoing teaching. It is therefore contemplated by the appended claims to cover such modifications and incorporate those features which come within the spirit and scope of the disclosure.

What is claimed is:

1. An n-node mesh network, comprising:

m external network interfaces, k loopback interfaces, and n−1 internal network interfaces; wherein each one of the n-nodes is interconnected to the other n−1 of the n-nodes each through one of the n−1 internal network interfaces to form the n-node mesh network;

wherein:

the n-node mesh network is logically segmented into n layers of virtual networks, where each of the n layers of virtual networks is a logical n-node mesh network;

each node of the logical n-node mesh networks is a segmented node, and an interface between two of the segmented nodes, comprises a sub-interface;

each of the segmented nodes comprises a route table;

the route table comprises a primary route table if the segmented node comprises the m external network interfaces and the k loopback interfaces in a same layer of the n layers of virtual network, or the route table comprises a transition route table; wherein, a loopback address representing an endpoint of a node comprises an advertised prefix in the segmented node;

the advertised prefix is redistributed, through an export/import mechanism, to each of the n−1 segmented nodes, which comprises the transition route table in the node, which sets up a route entry and a pointer, wherein the pointer points back to the primary route table for an additional table lookup, in each of the transition route tables in the node;

the advertised prefix in the segmented node is further advertised to other n−1 segmented nodes in a virtual network through a Border Gateway Protocol (BGP) process and route selection rules;

route entries of the primary route table, with Access Control List (ACL), are built up by receiving multi-path prefix advertisements from the other n−1 segmented nodes in a same virtual network; and the route entries of the transition route tables are built up by receiving prefix advertisements from the other n−1 segmented nodes in the same virtual network;

wherein m is an integer, m is equal or larger than 1, k is an integer, k is equal or larger than 1, and n is an integer, n is equal or larger than 3.

2. An n-node mesh network, comprising:

m external network interfaces, k loopback interfaces, and n−1 internal network interfaces; wherein each one of the n-nodes is interconnected to the other n−1 of the n-nodes each through one of the n−1 internal network interfaces to form the n-node mesh network;

wherein:

the n-node mesh network is logically segmented into n layers of virtual networks, where each of the n layers of virtual networks is a logical n-node mesh network;

each node of the logical n-node mesh networks is a segmented node, and an interface between two of the segmented nodes, comprises a sub-interface;

each of the segmented nodes comprises a route table;

the route table comprises a primary route table if the segmented node comprises the m external network interfaces and the k loopback interfaces in a same layer of the n layers of virtual network, or the route table comprises a transition route table, wherein each of the virtual n-node mesh networks, the sub-interfaces connecting the n−1 segmented nodes each has a transition route table all connecting to the segmented node which has the primary route table, Access Control List (ACL) prefix filtering to block the prefix advertisements is configured at the outgoing direction of the sub-interface of the segmented node containing the transition route table to facilitate creation of routes of non-minimal distance, and wherein m is an integer, m is equal or larger than 1, k is an integer, k is equal or larger than 1, and n is an integer, n is equal or larger than 3.

3. The n-node mesh network, according to claim 2, wherein, each of the virtual n-node mesh network, the ACL prefix filtering to block the prefix advertisement when configured at the outgoing direction of the sub-interface of the segmented node containing the transition route table forces the prefix advertisement advertising prefix through the other sub-interfaces of the segmented node containing the transition route table to facilitate creation of multi-path routes.

* * * * *